(12) United States Patent
Okazaki

(10) Patent No.: US 7,610,816 B2
(45) Date of Patent: Nov. 3, 2009

(54) FLOW MEASUREMENT DEVICE

(75) Inventor: Tadao Okazaki, Hamamatsu (JP)

(73) Assignee: OHM Electric Co., Ltd., Kita-ku, Hamamatsu (JP)

( * ) Notice: Subject to any disclaimer, the term of this patent is extended or adjusted under 35 U.S.C. 154(b) by 80 days.

(21) Appl. No.: 12/148,587

(22) Filed: Apr. 21, 2008

(65) Prior Publication Data

US 2009/0107252 A1    Apr. 30, 2009

(51) Int. Cl.
*G01F 1/58* (2006.01)
(52) U.S. Cl. .................................. 73/861.14
(58) Field of Classification Search ............. 73/861.08, 73/861.18, 861.14, 861.06, 861.05; 600/12, 600/504; 324/58.5
See application file for complete search history.

(56) References Cited

U.S. PATENT DOCUMENTS 5,793,216 A * 8/1998 Constant ..................... 324/639
6,009,760 A * 1/2000 Jakkula et al. ............ 73/861.06
6,015,387 A * 1/2000 Schwartz et al. ............. 600/504

FOREIGN PATENT DOCUMENTS

| JP | H05-010611 B | 2/1993 |
| JP | 2573645 | 10/1996 |
| JP | H10-160540 A | 6/1998 |

* cited by examiner

*Primary Examiner*—Jewel Thompson
(74) *Attorney, Agent, or Firm*—Yokoi & Co., U.S.A., Inc.; Peter Ganjian

(57) ABSTRACT

The present invention discloses a flow measurement device that includes: a wave guide tube type resonant cavity; a penetrating space that penetrates the resonant cavity; a duct support part that is made of a dielectric substance and is in the resonant cavity and surrounds an outside of the penetrating space; a transmitting antenna that transmits a microwave in a direction along a longitudinal axial direction of the resonant cavity to provide a standing wave or a traveling wave of the microwave, with the microwave transmitted in a space that is outside of duct support part and inside of the resonant cavity; and a receiving antenna that receives the standing wave or the traveling wave.

7 Claims, 11 Drawing Sheets

FLOW MEASUREMENT DEVICE

CROSS-REFERENCES TO RELATED APPLICATIONS

The present application is related to the Japan Patent Application No. 2007-283784, filed Oct. 31, 2007, the entire disclosure of which is expressly incorporated by reference herein.

BACKGROUND OF THE INVENTION (1) Field of the Invention

The present invention relates to a flow measurement device and, more particularly to a flow measurement device preferably used in technical fields for supplying a small amount of oil and feeding particulates and the like.

(2) Description of the Related Art

Recently, it is required to realize dry cutting works and to optimize of lubricating for bearings. In these applications, flow rates of lubricating oils are only a few several mL/h [milliliter per hour] and very small, methods to feed multi phase flows made by atomization and intermittent dropping of the lubricating oils are applied because feeding the lubricating oils by saturated consecutive flow is difficult. On the other hand, a method for in-line measuring the flow rate in oil-air method that is mainstream in a technical field of a very small amount of oil feeding, have not been provided because of a specificity of flow state of the oil-air method. Therefore, feeding the oil-air cannot help depending on a movement frequency of volumetric pump. The movement frequency is measured by electric or air timer in present situation. Meanwhile, reliable measurement method for measuring a flow rate of the very small amount of oil feeding described above have not been established. Further, in this technical field, a stability of an injection amount from the volumetric pump is about 20%, because the injection amount from the volumetric pump is very small and not stable.

Reflecting such a situation, a very small particulate flow measurement device using micro wave is suggested in Japan Patent No. 2573645. In Japan Patent No. 2573645, a sift of an interference pattern is detected by irradiating micro wave beam to flow passage of the minim particulate penetrating a cavity filled with a dielectric substance and the minim particulate flow rate is analyzed based on the sift of the interference pattern.

However, it is a problem that a measurement result is influenced by a position (physical location) of a particulate within the flow passage because constant potential of the micro wave cannot be provided in a cross sectional direction of the flow passage (a direction perpendicular to a longitudinal axial direction of the flow passage).

BRIEF SUMMARY OF THE INVENTION

The present invention discloses a flow measurement device that includes: a wave guide tube type resonant cavity; a penetrating space that penetrates the resonant cavity; a duct support part that is made of a dielectric substance and is in the resonant cavity and surrounds an outside of the penetrating space; a transmitting antenna that transmits a microwave in a direction along a longitudinal axial direction of the resonant cavity to provide a standing wave or a traveling wave of the microwave, with the microwave transmitted in a space that is outside of duct support part and inside of the resonant cavity; and a receiving antenna that receives the standing wave or the traveling wave.

These and other features, aspects, and advantages of invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and the drawings are to be used not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

Embodiments of the present invention are explained below as follows:
A. First embodiment:
  A1. Configuration of device:
  A2. Analytic theory:
B. Second embodiment:
C. Third embodiment:

A. First Embodiment

A1. Configuration of Device

Figure 1:
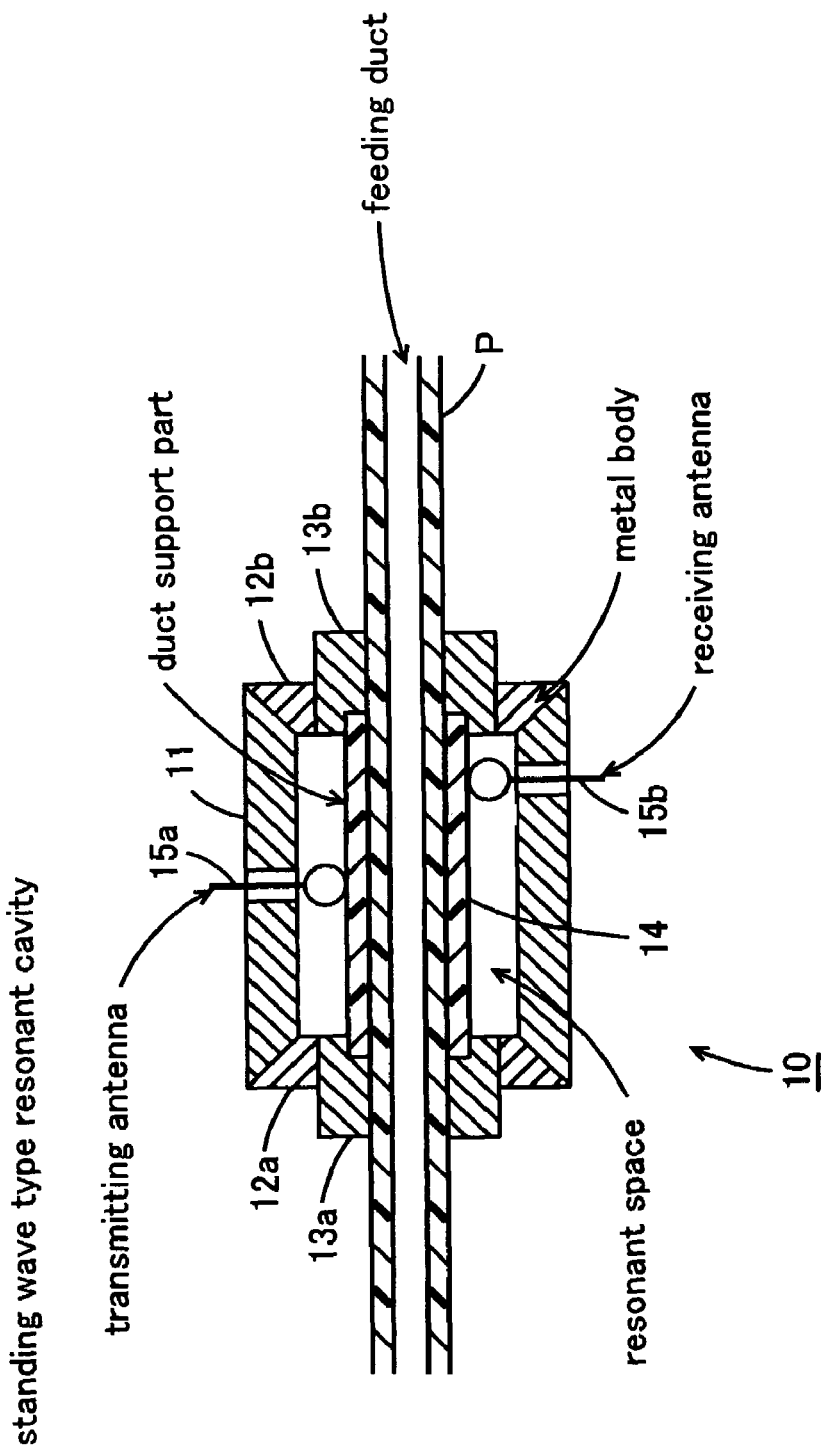
FIG. 1 is an exemplary cross sectional view of a resonant cavity used in a flow measurement device according to the present invention.

FIG. 1 is an exemplary cross sectional view of a resonant cavity used in a flow measurement device according to the present invention. As illustrated, the flow measurement device includes a standing wave type resonant cavity 10 in a substantial cylindrical shape made of a metal material. The resonant cavity 10 is comprised of a cylindrical main body 11 and edge walls 12a, 12b that substantially close both edges of the resonant cavity 10. Further included are metal cylinders 13a, 13b that protrude outward and are concentrically placed with a longitudinal axis of the edge walls 12a, 12b. Additionally included is a duct support part 14 that is made of a dielectric material and having both edges concentrically connected with the metal cylinders 13a and 13b in the cylindrical main body 11. The metal cylinders 13a, 13b and the duct support part 14 are made of the dielectric substance and are formed so that their inner diameters are identical. Consequently, the resonant cavity 10 has a penetrating space along a longitudinal axis thereof. In addition, the cylindrical main body 11, the edge walls 12a, 12b, and the metal cylinders 13a, 13b can be integrally formed or made of separate components to be assembled.

Further, the resonant cavity 10 is separable by a plane where the longitudinal axis of the resonant cavity 10 is included. That is, the resonant cavity 10 is formed separable in order to make the penetrating space be entirely exposed. By being separated by the plane, the resonant cavity 10 can be attached to an existing feeding duct P, with the feeding duct P enclosed by the metal cylinders 13a, 13b and with the duct support part 14 made of the dielectric substance. The metal cylinders 13a, 13b are configured to have sufficient length to achieve high accuracy of measurement by preventing radio waves from leaking and intruding between inside and outside of the resonant cavity 10.

As a basic structure, the penetrating space is formed by the cylindrical main body 11 and the edge walls 12a, 12b substantially closing both edges of cylindrical main body 11, and the metal cylinders 13a, 13b that have opening diameters smaller than an inner diameter of the resonant cavity 10 that are formed at openings of the penetrating space. Further, the duct support part 14 surrounds the penetrating space and supports the feeding duct P that is inserted into the penetrating space. According to these configurations, a wave guide tube type resonant cavity and a microwave propagation direction of the resonant cavity is oriented along the longitudinal axial direction thereof.

An exemplary one-turn-loop type transmitting antenna 15a and receiving antenna 15b corresponding to a microwave band frequency are independently placed in the resonant cavity 10. Microwave transmitted from the transmitting antenna 15a is propagated as microwave of Transverse Magnetic wave (TM) 01 mode in the resonant cavity 10, which functions as a wave guide tube. Herewith, the microwave is propagated along the longitudinal axial direction and the microwave is reflected by wall surfaces of metal cylinders 13a, 13b facing the inside of the resonant cavity 10. Then, a standing wave is provided in the resonant cavity 10 according to a resonance with the reflecting wave. The standing wave can be provided by making an effective length of the resonant cavity 10 equal to integral multiple value of ½ wavelength of the microwave transmitted from the transmitting antenna 15a in the wave guide tube (the resonant cavity 10).

Figure 2:
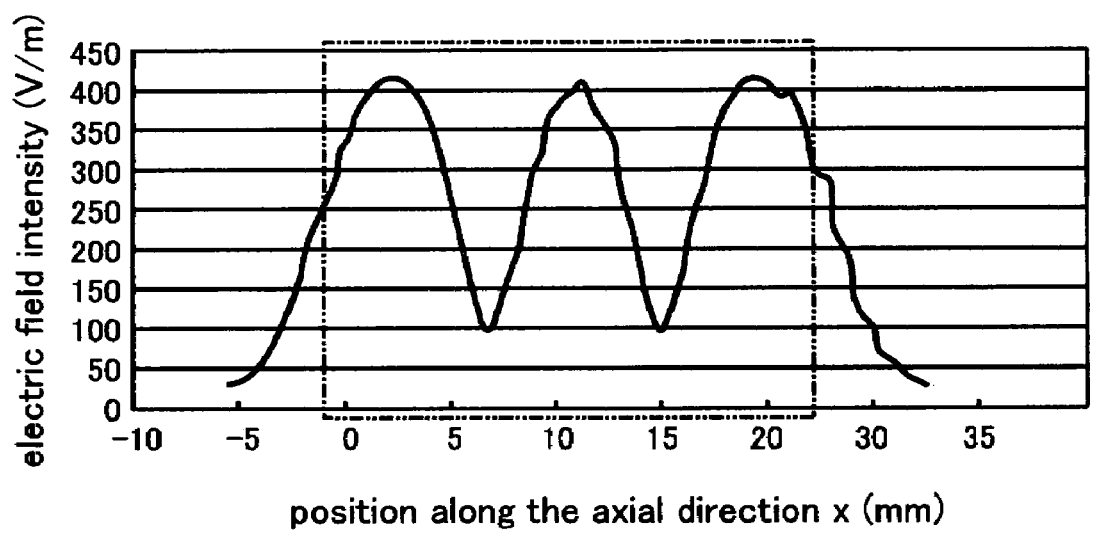
FIG. 2 is an exemplary diagram simulating a standing micro wave in the resonant cavity.

FIG. 2 shows a simulated result of the standing wave provided in a resonant space in the resonant cavity 10. In FIG. 2, a abscissa axis indicates positions along the longitudinal axial direction of the resonant cavity 10, with a vertical axis indicating an electric field intensity of the standing wave. In addition, a state that the standing wave along the longitudinal axial direction is realized by excitation of the microwave at 24.15 GHz with a condition that a typical urethane tube for oil-air whose outer diameter is 4 mm and inner diameter is 2 mm is penetrated as the feeding duct P, is simulated. As illustrated in FIG. 2, 2.5 times of the wavelength sinusoidal standing wave is provided along the longitudinal axial direction.

Figure 3:
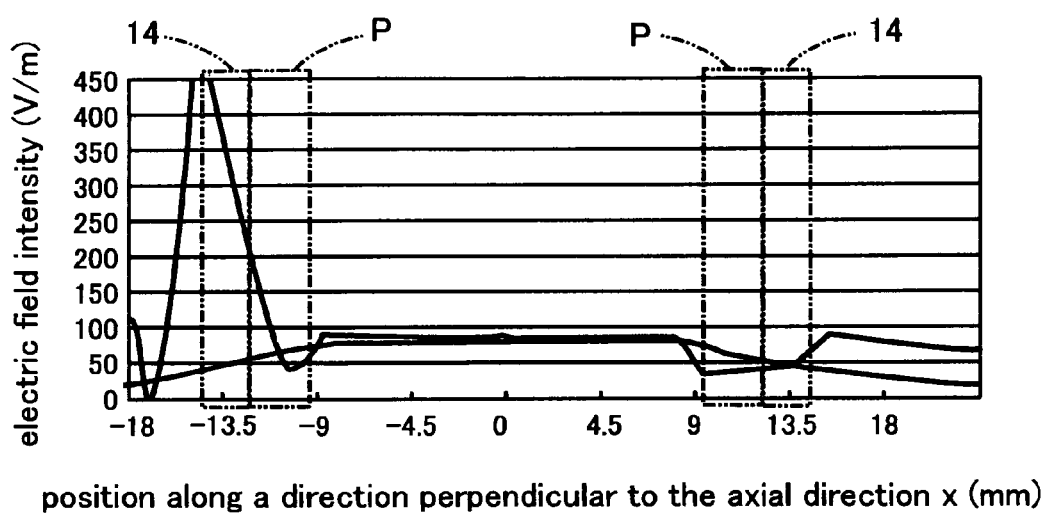
FIG. 3 is an exemplary diagram simulating the standing micro wave in the resonant cavity.

FIG. 3 shows a simulated result of the standing wave provided in the resonant space in the resonant cavity 10. In the FIG. 3, an abscissa axis indicates positions along a direction perpendicular to the longitudinal axial direction (in a constant position in the longitudinal axial direction) and a vertical axis indicates the electric field intensity of the standing wave. As illustrated in FIG. 3, substantially uniform electric field intensity is obtained despite positions of the direction perpendicular to the longitudinal axial direction. In the resonant cavity 10, interfaces whereon different electric permittivity are interfacing each other are formed on a first interface between internal air and the duct support part 14 with a predetermined electric permittivity and a second interface between the duct support part 14 and the metal cylindrical main body 11. Microwave reflection is arisen on these interfaces. Further, microwave absorption is arisen in the duct support part 14 having the predetermined electric permittivity. The substantially uniform electric field intensity in the direction perpendicular to the longitudinal axial direction can be obtained because of an interaction between these reflections and absorptions. As explained above, an electromagnetic field potential with an electric field intensity that is fluctuating such as a sinusoidal standing wave along the longitudinal axial direction, and is substantially uniform in the direction perpendicular to the longitudinal axial direction, can be provided. For example, a thickness of the duct support part 14 may be used that can make the electric field intensity in the direction perpendicular to the longitudinal axial direction, which is most uniform while the thickness of the duct support part 14 gradually changes. A state of the electromagnetic field potential according to the abovementioned standing wave can be observed by making the receiving antenna 15b receive the microwave.

Figure 4:
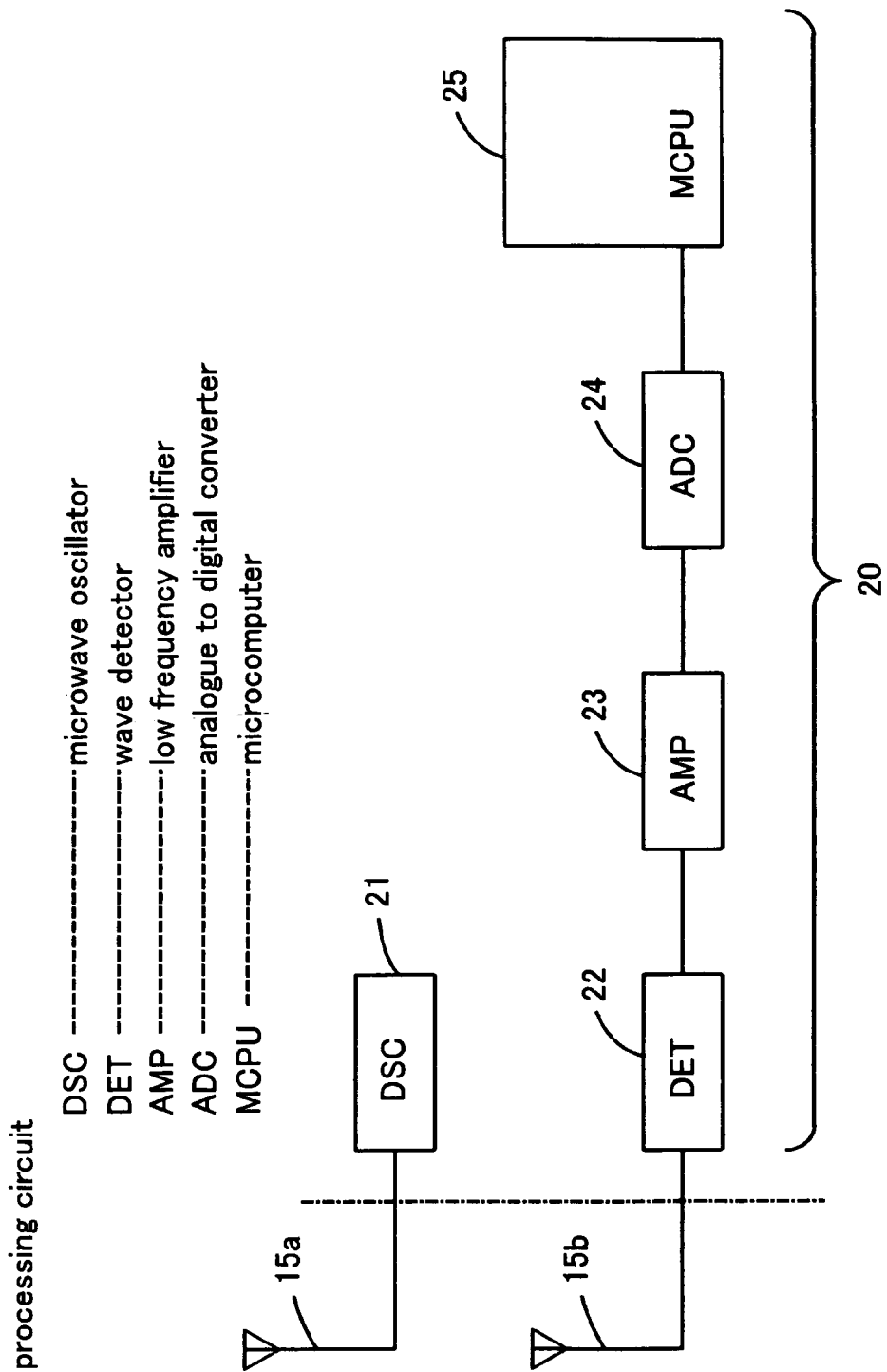
FIG. 4 is an exemplary block diagram showing a processing circuit.

FIG. 4 is a block diagram illustration, which shows a measurement circuit 20 that will be connected to the transmitting antenna 15a and the receiving antenna 15b of the resonant cavity 10. The transmitting antenna 15a is connected to the microwave oscillator 21. A wavelength of microwave oscillated by the oscillator 21 is set to a wavelength and a frequency that can provide the standing wave in the resonant cavity 10 (illustrated FIG. 1). The microwave transmitted by the transmitting antenna 15a of the present embodiment is a microwave with a frequency that is 24.15 GHz, which is admitted by a Japanese regulation law for using for velocity measurements. Further, if an electric power supplied to the transmitting antenna 15a is not larger than 10 mW, an external leakage radio wave into atmosphere cannot be an object of regulation. A calculated value of the leakage radio wave strength is 1.5 μV/m in case when using the resonant cavity 10 mentioned above, and is much lower than strength of 35 μV/m at 3 m distant that is a generally regulated value. Though, it is preferable that the leakage radio wave is decreased because decreasing the leakage radio wave has importance not only to satisfy the regulation law but also to decrease disturbance by a substance existing outside of an inspecting space. On the other hand, the receiving antenna 15b is connected to a wave detector 22, an output from the wave detector 22 is amplified by a low frequency amplifier 23 and digitalized by a analogue to digital converter (A/D converter) 24, and a digital data is acquired and analyzed by a microcomputer 25.

A2. Analytic Theory

Figure 5:
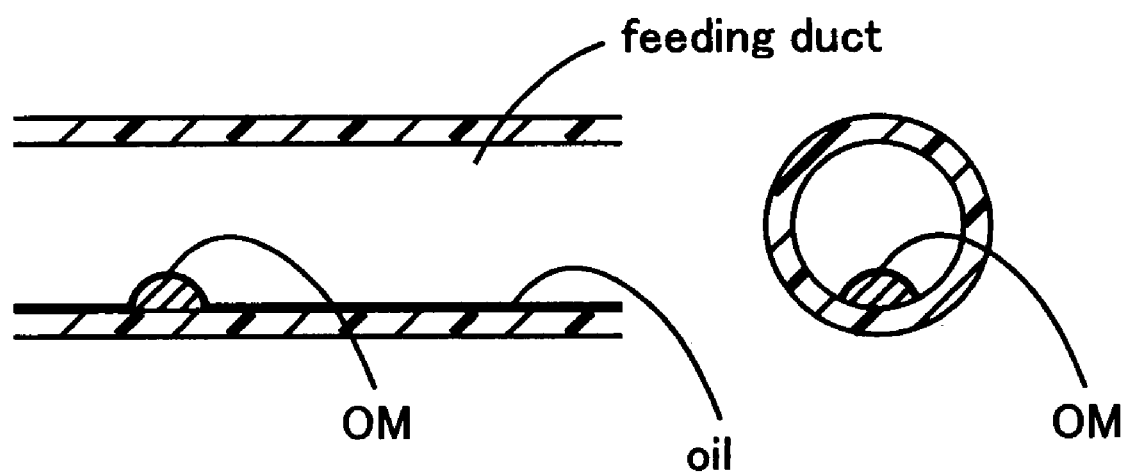
FIG. 5 is an exemplary schematic diagram showing a state of oil particulate flow.

A theory of how the flow measurement device is configured as mentioned above analyzes a flow velocity of oil particulates included in the oil-air combination and how oil particulates flow with air in the feeding duct P. The oil-air is an air flow to supply the oil particulates and is used for supplying minim volume oil to each kind of machines. Oil is supplied by the oil supplying systems using oil-air by intermittently dropping minim volume oil particulates by volumetric pumps and the like into the feeding duct P wherein air flows in a high speed. Adjustments of the oil volume supplied are generally realized by adjusting a dropping frequency. Though, the oil particulates will be leveled as flowing to downstream, spatial spots of the oil particulates remain for several meters from just after the dropping. The oil-air is provided as illustrated in FIG. 5 that schematically and exaggeratingly illustrates the oil-air because photographing the oil-air through the duct is difficult. As illustrated, the flow of the oil particulates are along a wall of the feeding duct P and are parallel along the longitudinal axial direction of the feeding duct P. However, it cannot be specified where the oil particulates exist in a cross sectional plane perpendicular to the longitudinal axial direction.

The receiving antenna 15b is continuously receiving the microwave, and a fluctuation of the electric field intensity of the microwave is continuously observed by the microcomputer 25 through the wave detector 22, the low frequency amplifier 23 and the A/D converter 24. Basically, a constant electric field intensity is measured by the microcomputer 25 because the received microwave is the standing wave as mentioned above. That is, in case air without any particulates such as oil particulates having the electric permittivity different from that of the air flows in the feeding duct P, the electric field intensity becomes constant, and the fluctuation of the electric field intensity is not observed by the microcomputer 25. However, if the oil-air flows in the feeding duct P axially penetrating a center of the electromagnetic field potential mentioned above, the electromagnetic field potential is disturbed by the oil particulates being dotted in the oil-air and the fluctuation of the electric field intensity (received electric power) in response to the disturbed electromagnetic field potential is observed by the receiving antenna 15b. Because the oil particulates have electric permittivity and a dielectric loss angle different from air, and the microwave is absorbed by the oil particulates. Although a plurality of oil particulates exists in a normal particulate flow, the following provides a procedure and a theory for analyzing the flow velocity of a single oil particulate for ease of understanding.

Assume an oil particulate OM with the volume q, an electric permittivity $\epsilon$ and a dielectric loss angle $\delta$ is flowing along the longitudinal axial direction of the feeding duct P in the electromagnetic field potential wherein the electric field intensity E varies sinusoidally because of a standing microwave. The electric permittivity $\epsilon$ and the dielectric loss angle $\delta$ are known values because physicality of the oil particulate OM can be preliminarily surveyed. In case the oil particulate OM exists in the electric field intensity E, the oil particulate OM absorbs the microwave and, consequently, the electric power of the microwave is absorbed. An absorbed electric power is mainly converted to heat energy, which can be applied to a heating technology for kitchen microwaves and the like. Here, f represents the frequency of the microwave and S represents the absorbed electric power by the oil particulate OM, the absorbed electric power S absorbed by a unit volume of the oil particulate OM is expressed by equation 1 (ref. 8 page in the trade edition of the collection of microwave heating technology).

[Equation 1]

$$S = 2\pi f E^2 q \epsilon \tan\delta \quad (1)$$

According to equation 1, the absorbed electric power S can be calculated by multiplying the electric permittivity $\epsilon$ and a dielectric loss tangent $\tan\delta$ to an electric power $E^2$ where there is no absorption by the oil particulate OM. It should be noted that microwave absorptions depend on depths of a microwave penetration, however, the influence by the depths of the microwave penetration can be ignored because the oil particulate OM is a minute particle and the entire volume of the oil particulate OM can be considered to be in shallow depths. Therefore, the absorbed electric power S by the entire oil particulate OM can be calculated by multiplying the remaining components of the equation with the OM volume q.

The electric field intensity E can be expressed by equation 2 using a position x along the longitudinal axial direction of the feeding duct P where the oil particulate OM exists because the electric field intensity E is simulated to be sinusoidally provided in the feeding duct P as illustrated in FIG. 2.

[Equation 2]

$$E = A\sin\left(\frac{2\pi x}{\lambda}\right) \quad (2)$$

In equation 2, A represents amplitude of the electric field intensity E, and $\lambda$ represents a wavelength of the electric field intensity E (of the standing wave). The term x/t represents the flow velocity of the oil particulate OM along the longitudinal axial direction at position x along the longitudinal axial direction of the feeding duct P where the oil particulate OM exists, using a time t, as shown in equation 3.

[Equation 3]

$$x = Ut \quad (3)$$

Equation 4 can be obtained by substituting equation 2 and equation 3 for parts of equation 1.

[Equation 4]

$$S = 2\pi f A^2 \sin\left(\frac{2\pi Ut}{\lambda}\right)^2 q\epsilon\tan\delta \quad (4)$$

According to equation 4, the absorbed electric power S is expressed by a periodic function of the time t. At the same time, it can be said that the absorbed electric power S is expressed by a periodic function of the position x. Equation 5 is validated to an arbitrary angle $\theta$ according to double-angle formula for $\cos\theta$.

[Formula 5]

$$\sin^2\theta = \frac{1-\cos 2\theta}{2} \quad (5)$$

Equation 6 is obtained by optimizing equation 4 according to a relation of the equation 5.

[Equation 6]

$$S = \pi f A^2 q\epsilon\tan\delta\left\{1 - \cos\left(\frac{4\pi Ut}{\lambda}\right)\right\} \quad (6)$$

A first term of equation 6 is a direct current component indicating a constant value despite the position x and the time t. On the other hand, a second term is including a cosine function and is an alternate current component that indicates periodical fluctuation in a space period among positions as x=Ut=λ/2. That is, the alternate current component of the absorbed electric power S periodically fluctuates in a period, for every time when the oil particulate OM moves a length equal to λ/2, which is virtually a half length of the microwave (the standing wave). Further, a value of amplitude of this alternate current component is proportional to the volume q. According to considerations mentioned above, it can be understood that the absorbed electric power S by the oil particulate OM passing the electromagnetic field potential caused by the standing wave includes the alternate current component having the space period of moving distances of the oil particulate OM equal to λ/2, and the amplitude of this alternate current component is proportional to the volume q of the oil particulate OM. In addition, it can be considered that equation 6 is reasonable wherever the oil particulate OM flows in the direction perpendicular to the longitudinal axial direction, because the electric field intensity E is kept uniform with respect to any position in the direction perpendicular to the longitudinal axial direction.

The receiving antenna 15b receives the microwave, and the microcomputer 25 determines the electric field intensity E of this microwave. Therefore, a mutually complementary relationship exists in accordance with the conservation law between the absorbed electric power S mentioned above and the received electric power RP calculated by squaring the electric field intensity calculated by the microcomputer 25. Accordingly, a periodic fluctuation in a period corresponding to the flow velocity of the oil particulate OM can be observed in the received electric power RP, similarly to the absorbed electric power S and an amplitude of the received electric power RP being proportional to the volume q of the oil particulate OM. Thus, the alternate current component corresponding to the second term of above mentioned equation 6 can be extracted by extracting an alternate current component from the received electric power RP detected by the microcomputer 25. Further, the flow velocity U and the volume q of the oil particulate OM can be calculated based on the frequency and the amplitude of the alternate current component.

Figure 6:
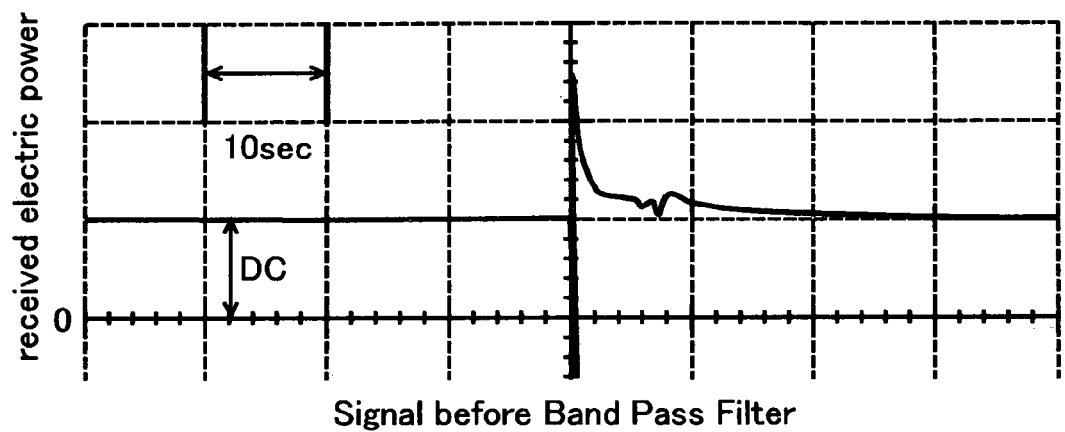
FIG. 6 is an exemplary diagram showing a signal of a received electric power before input to a band pass filter.
Figure 7:
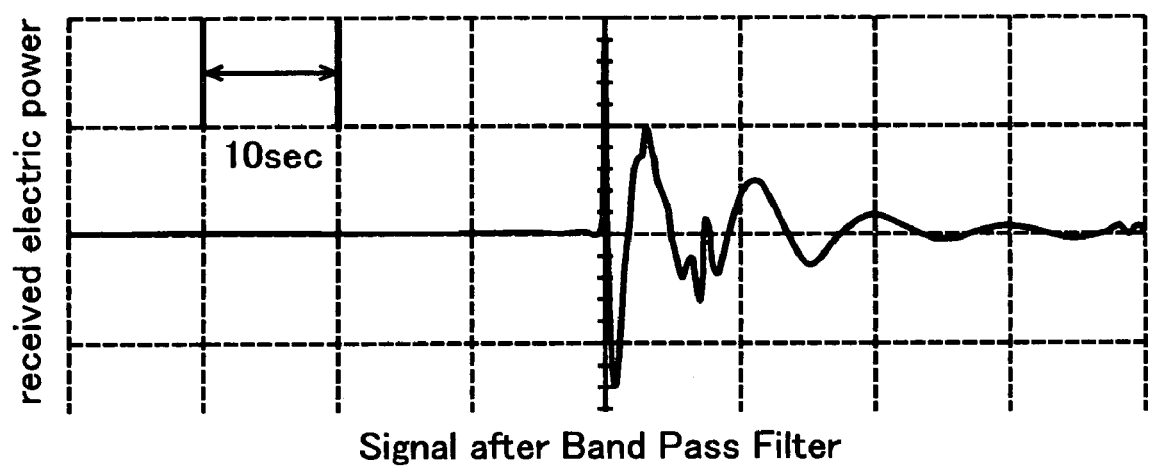
FIG. 7 is an exemplary diagram showing a signal of the received electric power after input to the band pass filter.

The above described principles for a single oil particulate OM. However, it is necessary to simultaneously analyze a plurality of particulates because general particulate flow simultaneously includes the plurality of the particulates. FIG. 6 illustrates the received electric power RP detected by the wave detector 22 after being received by the receiving antenna 15b, and FIG. 7 shows the received electric power RP further amplified by the low frequency amplifier 23. In these diagrams, a vertical axis indicates the received electric power RP and an abscissa axis indicates the time t. In case the measurement of the general particulates is operated, a composite waveform consisted of a plurality of distinct frequency components can be obtained as illustrated in these diagram. Fast Fourier Transformation (FFT) is used to perform a statistical analysis for these frequency components in the present embodiment. In addition, a direct current component of the received electric power RP is continuously measured, because a reception of the standing wave (the electromagnetic field potential not to be disturbed by the oil particulate OM) is performed even when the oil particulate OM does not flow. This direct current component mainly reflects the electric field intensity transmitted from the transmitting antenna 15a. And this direct current component also reflects static elements that does not depend on time, that is to say, this direct current component also reflects absorbed electric power elements absorbed by the duct support part 14 and the feeding duct P.

Figure 8:
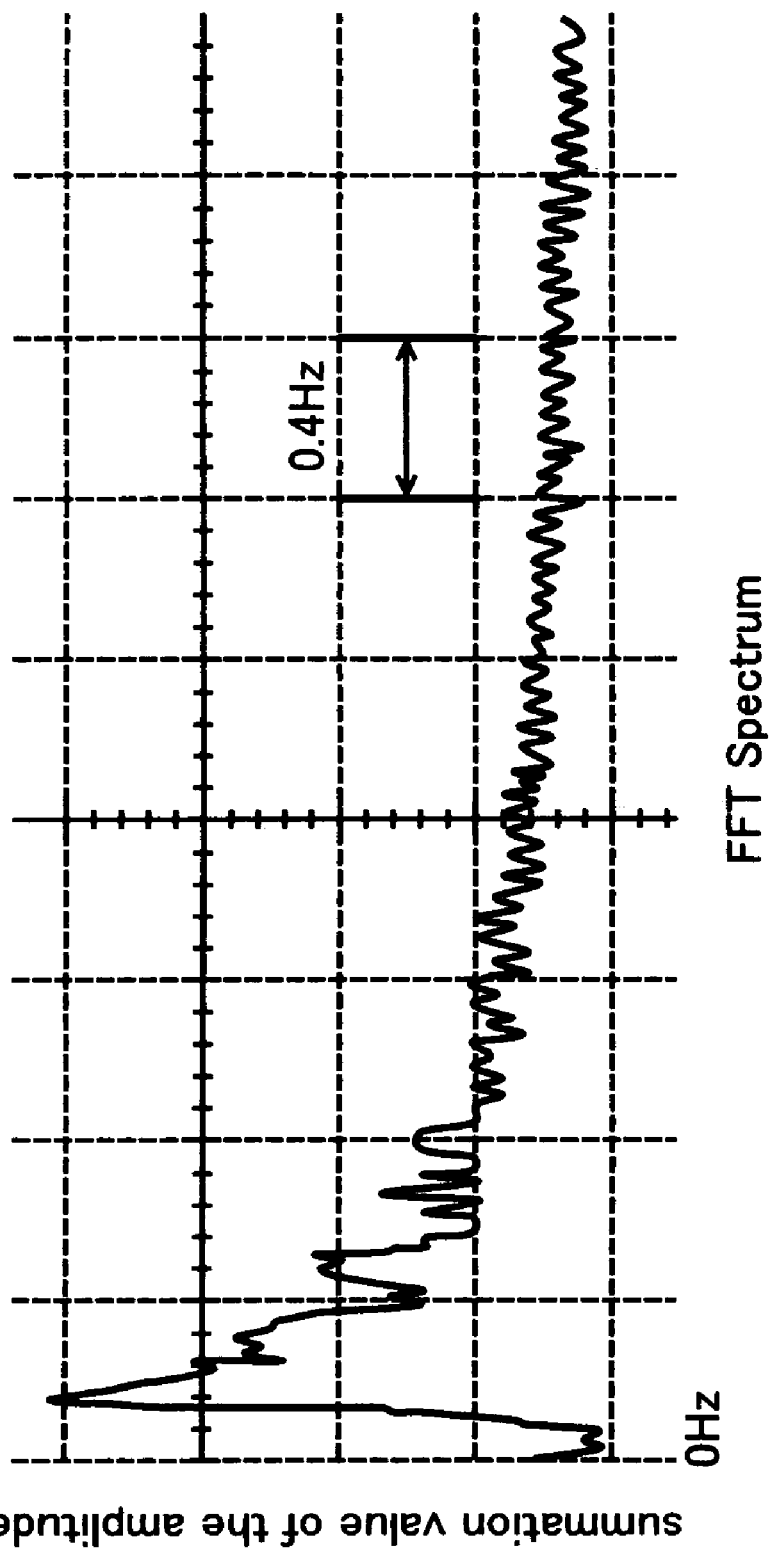
FIG. 8 is an exemplary diagram showing a FFT [Fast Fourier Transform] spectrum of the received electric power after input to the band pass filter.

FIG. 8 illustrates a spectrum of the received electric power RP after the application of FFT. In FIG. 8, an abscissa axis indicates a frequency interval $f_i$ (where i is a natural number that distinguishes the frequency intervals in the Fourier space), and a vertical axis indicates a summation value $a_i$ of the amplitude of the alternate current component of the received electric power RP with respect to each frequency interval $f_i$. Each frequency (frequency interval $f_i$) of the each element of the alternate current component of the received electric power RP can be analyzed by performing the FFT. Further, the alternate current component of the received electric power RP is comprised of a planarity of elements caused by each of the oil particulates OM, though, the amplitude of each element can be analyzed and summated with respect to each of the frequency interval $f_i$. It can be said that the oil particulates OM move through a distance of λ/2 in each elapse of each frequency interval $f_i$ obtained by the FFT, because it can be understood that the alternate current component of the received electric power RP is periodic in a space of λ/2 virtually a half length of the microwave (the standing wave) according to the equation 6 mentioned above. That is, the oil particulates OM move through the distance of λ/2 as often as a number of times same as the each frequency interval $f_i$ per unit time. Therefore, flow velocities $U_i$ (moving distance per unit time) of the oil particulates OM with respect to each frequency interval $f_i$ can be calculated by equation 7 described below.

[Equation 7]

$$U_i = f_i \times \frac{\lambda}{2} \quad (7)$$

It can be understood how fast the flow velocities $U_i$ of the oil particulates OM included in the oil-air are, according to the procedure described hereinbefore. Next, a flow rate Q is calculated by equation 8 mentioned below.

[Equation 8]

$$Q = k \sum_{i=1} U_i \times a_i \quad (8)$$

In equation 8, the flow rate Q is calculated by multiplying each of the flow velocities $U_i$ and each of the summation value $a_i$ of the amplitude of the alternate current component of the received electric power RP with respect to each frequency interval $f_i$, summating this multiplied values through all frequency intervals $f_i$ and further multiplying a predetermined adjustment coefficient k to this summated value. It can be considered that the summation values $a_i$ of the amplitude with respect to each frequency interval $f_i$ are proportional to summation values of the volumes q of a plurality of the oil particulates OM belonging to each frequency interval $f_i$, because it can be understood that the amplitude of the alternate current component of the received electric power RP is proportional to the volume q of the oil particulates OM according to equation 6 described above. On the other hand, it can be considered that the values of $U_i \times a_i$ are proportional to summation values of the volumes q of a plurality of the oil particulates OM existing in an unit length along the longitudinal axial direction and belonging to each frequency interval $f_i$, because it can be considered that the flow velocities $U_i$ are values corresponding to probability that the oil particulates OM belonging to each frequency interval $f_i$ corresponding to these flow velocities $U_i$ exist in an unit length along the longitudinal axial direction. Therefore, the value of $\Sigma U_i \times a_i$ calculated by summating $U_i \times a_i$ values through all frequency intervals $f_i$ is proportional to summation value of all flow rate Q.

In principle, a theoretical value for the adjustment coefficient k can be specified based on the physicality values such as the electric permittivity $\epsilon$, a dielectric loss tangent $\tan \delta$ and the like, because a meaning of an absolute value of the amplitude of the alternate current component of the received electric power RP can be specified according to equation 6 mentioned above. However, the adjustment coefficient k is obtained by a preliminary testing. In the preliminary testing, the value of $\Sigma U_i \times a_i$ in equation 8 is calculated by performing the analysis according to the aforementioned procedure, and the flow rate Q in the same time is simultaneously measured by trapping the oil-air. Then, the adjustment coefficient k is calculated by dividing the actual flow rate Q by the value of $\Sigma U_i \times a_i$. In addition, it is preferable to calculate the adjustment coefficient k that has a high correlation with the value of $\Sigma U_i \times a_i$ with generalizing a plurality of the preliminary testing results because that should be greatly influenced form accidental errors in the single preliminary testing.

By the way, the amplitude A of the electric field intensity E in equation 6 has a property that can be calculated based on the electric field intensity transmitted by the transmitting antenna 15a, on the other hand, it is hugely difficult to stabilize the electric field intensity transmitted by the transmitting antenna 15a. Fluctuations not smaller than 10% are observed, within actual measurement results of indoor supply stabilities of MDUs [Microwave Doppler Unit] that are generally put on the market. Thermal properties of diodes detecting the electric power are included in the fluctuations. Therefore, it is concerned that a difference between the electric field intensity transmitted by the transmitting antenna 15a in the preliminary testing to calculate the adjustment coefficient k and the electric field intensity transmitted by the transmitting antenna 15a in actual measurement will become a measurement error. Consequently, the measurement error can be refrained by performing a modification according to equation 9 mentioned below.

[Equation 9]

$$Q = k \frac{D_1}{D_0} \sum_{i=1} U_i \times a_i \tag{9}$$

$D_0$ represents a magnitude of the direct current component DC of the received electric power RP when the adjustment coefficient k is calculated and $D_1$ represents a magnitude of the direct current component DC of the received electric power RP in the actual measurement. The flow rate Q that is not influenced from the electric field intensity transmitted by the transmitting antenna 15a can be calculated, because the direct current component DC can be considered as a value reflected by the electric field intensity transmitted by the transmitting antenna 15a as described above. In addition, it is necessary to calculate the adjustment coefficient k with respect to each kind of the oil particulates OM, because the amplitude of the alternate current component of the received electric power RP depends on the electric permittivity $\epsilon$ and a dielectric loss tangent $\tan \delta$ of the oil particulates OM.

On the other hand, a total volume of the oil particulates OM existing in an effective space of the feeding duct P can be measured by an easier method. That is, the received electric powers received by the receiving antenna 15b are preliminarily observed with respect to cases that a plurality of known volumes including absolute none of the oil particulates OM exist in the feeding duct P. Then correspondences between the volumes and absorbed electric powers (values calculated by subtracting the received electric power received when none of the oil particulates OM exist in the feeding duct P from the received electric powers received when the plurality of known volumes of the oil particulates OM exist in the feeding duct P) are put in a table, and it is possible to specify the volume corresponding to the absorbed electric power during the measurement with referencing this table. Of course, it is also preferable to perform a modification based on the electric power output from the transmitting antenna 15a and its variation in this case.

For example, assuming that the received electric power RP get to be $RP_i$ when a volume $V_o$ is placed in the feeding duct. Making the table is performed with accurately measuring and gradually varying the volume $V_o$. It can be said that the difference between the absorbed electric power with existence of the volume $V_o$ of the oil particulates OM and the absorbed electric power without existence of the oil particulates OM is an absorbed radio wave amount $G_o$. Therefore, after plotting the correspondence between the absorbed radio wave amount $G_o$ and the volume $V_o$, the current volume V can be calculated by calculating the difference between a reference absorbed electric power and a temporary absorbed electric power.

Similar measurement can be realized by using a reflection electric power by the oil particulates OM. On the other hand, it is known that tiny fluctuation of the resonant frequency corresponding to an amount of the oil particulates OM existing in the duct can be observed. Therefore, volumes of the flow at each time can be specified based on the amount of the fluctuation of the resonant frequency by measuring the resonant frequency. That is, in case the flow volume $V_o$ is existing, this resonant frequency fluctuates by an amount of $\Delta f_o$ from the resonant frequency $f_s$ of a time when the flow is not existing. Therefore, after plotting the correspondence between the fluctuated amount $\Delta f_o$ and the volume $V_o$, the current volume V can be calculated by measuring the fluctuated amount $\Delta f_o$.

In addition, what performs the analysis for the oil-air that the oil particulates OM moves on the duct wall of the feeding duct P is exemplified in the present embodiment, though the flow velocity of an oil-mist flowing in the feeding duct P with being atomized can also be measured by similar method. Further, the present invention can be applied for particulates having constant electric permittivity and the present invention can be applied for particulates other than the oil. And it is possible to measure the flow velocity of the particulates and the like by analyzing the reflection electric power reflected by the particulates with specified reflectance, though what the flow velocity of the particulates and the like is measured by measuring the absorbed electric power is exemplified in aforementioned embodiment.

B. Second Embodiment

Figure 9:
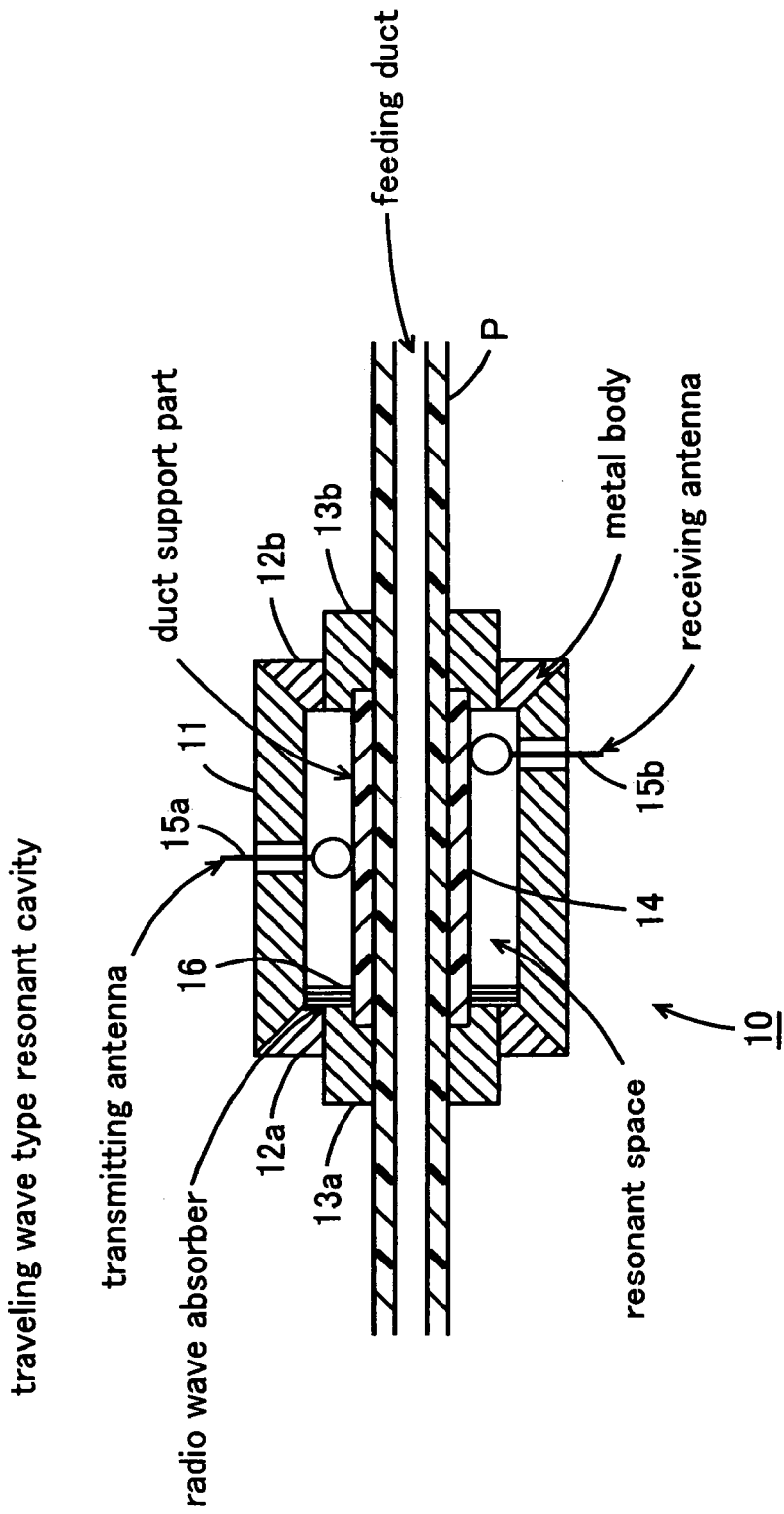
FIG. 9 is an exemplary cross sectional view of a resonant cavity according to a modified embodiment.

In FIG. 9, a non-reflecting plane is added to all aforementioned components illustrated in FIG. 1 by placing a radio wave absorber 16 at an inner wall of an axial edge of the edge walls 12a. According to this configuration, a traveling wave can be provided in the resonant cavity 10. It is possible to provide the electromagnetic field potential that has substantial uniform electric field intensity in the direction perpendicular to the longitudinal axial direction of the resonant cavity 10. And the fluctuation of the electromagnetic field potential can be detected through the receiving antenna by making the oil-air including the unsaturated oil particulates OM as dielectric substances. However, it is necessary to perform an analysis according to a method other than that of the aforementioned analysis, because the electric field intensity of the microwave as the traveling wave received by the receiving antenna 15b is continuously fluctuates.

The traveling wave catches up with the oil particulates OM and a reflected wave is generated, because the velocity of the microwave as the traveling wave proceeding along the longitudinal axial direction in the resonant cavity 10 is much faster than the flow velocity of the oil particulates OM. This reflected wave reaches to the receiving antenna 15b and is received by the receiving antenna 15b. The receiving antenna 15b receives a composite wave consisted of a transmitted wave and the reflected wave. A electric field intensity of the composite wave can be expressed by equation 10 described below.

[Equation 10]

$$A \sin 2\pi f_1 t \times B \sin 2\pi f_2 t = AB\{\cos 2\pi(f_1-f_2)t - \cos 2\pi(f_1+f_2)\} \quad (10)$$

A represents amplitude of the transmitted wave, B represents amplitude of the reflected wave, $f_1$ represents a frequency of the transmitted wave and $f_2$ represents a frequency of the reflected wave in equation 10. The composite wave is a multiplication of the transmitted wave and the reflected wave as shown in a left-hand side of equation 10 and the composite wave can be developed as a right-hand side. A beat frequency meaning a difference between the frequency of the transmitted wave and the frequency of the reflected wave. $(f_1-f_2)$ appears in a first term of the right-hand side, and a sum of the frequency of the transmitted wave and the frequency of the reflected wave $(f_1+f_2)$ appears in a second term of the right-hand side. That is it can be said that the composite wave is comprised of a high frequency element and a low frequency element.

Here, the reflected wave reflected by the oil particulates OM can be considered as a modulated wave (Doppler wave) whose frequency is modulated by Doppler effect. Therefore, a relationship between the frequencies of the transmitted wave and the reflected wave according to equation 11 described below can be reasonable with assuming C (velocity of light) as the velocity of the microwave, setting U as the flow velocity of the oil particulates OM and setting θ as a angle between a propagating directions of the traveling microwave and the oil particulates OM. In addition, θ=0 and cos θ=1 can be substituted, because both of the propagating directions of the traveling microwave and oil particulates OM are the longitudinal axial direction of the feeding duct P.

[Equation 11]

$$f_2 = \frac{C-U}{C+U} f_1 \cos\theta \quad (11)$$

Equation 11 can be expressed by equation 12 because of C>>U.

[Equation 12]

$$\delta f = (f_1-f_2) = 2f_1 U/C \times \cos\theta \quad (12)$$

A relationship between the beat frequency δf in the composite wave and the flow velocity U of the oil particulates OM can be calculated according to equation 12. Therefore, the flow velocity U of the oil particulates OM can be calculated by analyzing the frequency (beat frequency) of the low frequency element among the composite wave received by the antenna 13.

That is, the FFT for the fluctuation of the electric field intensity at the receiving antenna 15b is performed, and the beat frequency δf is calculated from a frequency spectrum provided by the FFT. Further, the flow velocity U of the oil particulates OM can be calculated by substituting this beat frequency δf into equation 3 described above. A procedure to measure the flow velocity U of the oil particulates OM based on a receiving state of the receiving antenna 15b is thus far explained, further it is possible to calculate the flow rate Q of the oil particulates OM by calculating the volume of the oil particulates OM based on a receiving state of the receiving antenna 15b.

The reflected wave reflected on interfaces between the air and the oil particulates OM is received by the receiving antenna 15b, it is known that this reflectance is determined based on the physicality (magnetic permeability, electric permittivity) and the volume of the oil particulates OM. The volume of the oil particulates OM can be calculated by specifying an amplitude reflectance that is a rate of the amplitude (amplitude A) of the electric field intensity of the transmitted wave and the amplitude (amplitude B) of the electric field intensity of the reflected wave, because the physicality of the oil particulates OM used for lubricant oils is known value. The volume of the oil particulates OM can be calculated by preliminary checking a relationship between the amplitude reflectance and the volume of the oil particulates OM, storing a table specifying this relationship in a ROM (not illustrated) of the microcomputer 25 and referencing the table. If the volume of the oil particulates OM can be specified, the flow rate per unit time can be calculated by multiplying the aforementioned flow velocity U to the volume.

C. Third Embodiment

Figure 10:
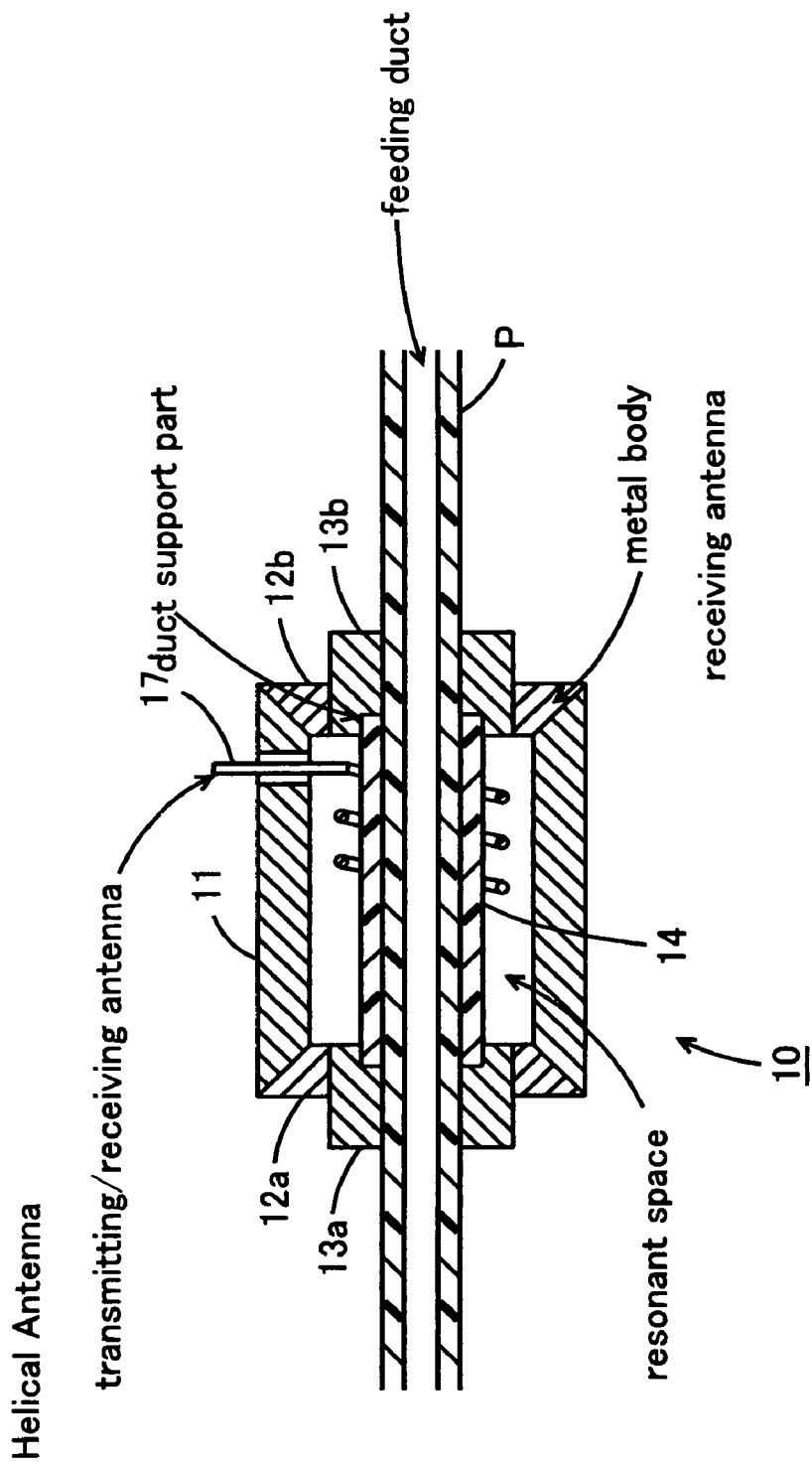
FIG. 10 is an exemplary cross sectional view of a resonant cavity according to another modified embodiment.
Figure 11:
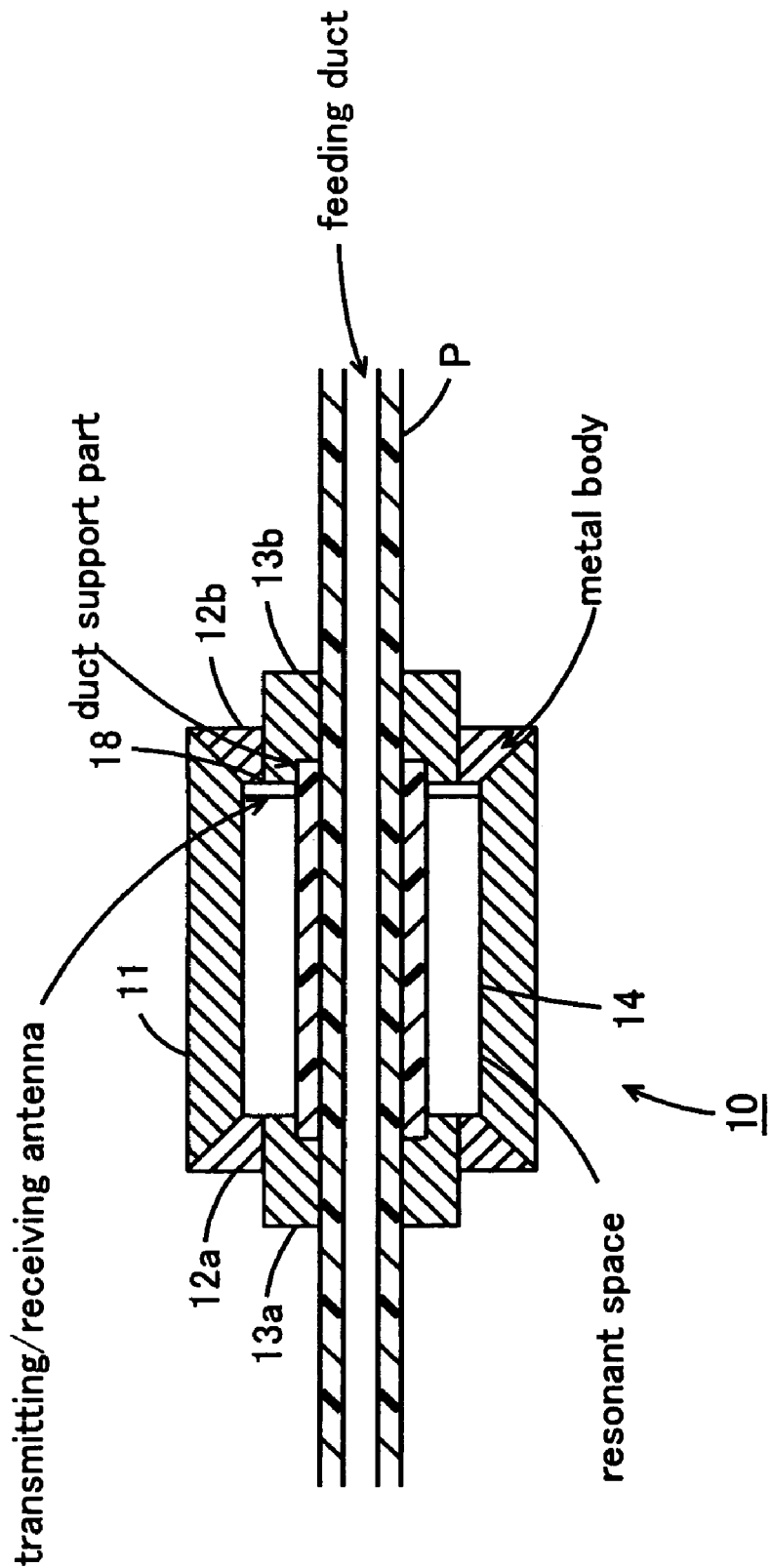
FIG. 11 is an exemplary cross sectional view of a resonant cavity according to another modified embodiment.

FIG. 10 shows a modified embodiment that a pair of the transmitting antenna 15a and the receiving antenna 15b is replaced by a transmitting/receiving antenna 17 comprised of a helical antenna 17, FIG. 11 shows a modified embodiment comprised of a transmitting/receiving antenna 18 made of a plane spiral antenna placed along the side of the edge wall 12b. In addition, in case using these transmitting/receiving antennas 17 and 18, the resonant cavity is formed in separable so that facing leads can electrically connect each other and form a specified length of a continuous electrically-conducting path to operate as a specified length of antenna. According to this configuration, an analysis similar to that of the first embodiment can be performed too.

As explained above, according to each embodiment of the present invention, the flow measurement device that can realize the accuracy flow rate measurement for the fields such like feeding the minim liquid and the powder by forming the spatial filter caused by the standing wave or the traveling wave and calculating the flow rate with measuring the volume of passing oil particulates during an observation time.

One aspect of the present invention is configured to include a metal cylinder that protrudes to outside from an opening of the penetrating space of the resonant cavity and has an opening diameter smaller than an inner diameter of the resonant cavity.

And, in another aspect of the present invention, the resonant cavity is formed in separable so that entire of the penetrating space can be exposed. According to this configuration, accurately measurement of a flow rate in feeding minim liquid and powder including an oil feeding field, can be possible.

Further, in another aspect of the present invention, the standing wave is provided in the resonant cavity; and the flow measurement device calculates a flow velocity of a dielectric fluid flowing in the penetrating space based on a frequency of an alternate current component of a received electric power received by the receiving antenna.

And, in one aspect of the present invention, the standing wave is provided in the resonant cavity; and the flow measurement device calculates a volume of a dielectric fluid flowing in the penetrating space based on a amplitude of an alternate current component of a received electric power received by the receiving antenna.

Further, in another aspect of the present invention, the flow measurement device modifies the volume based on a direct current component of the received electric power received by the receiving antenna when the volume is calculated.

And, in one aspect of the present invention, the traveling wave is provided in the resonant cavity; and the flow measurement device calculates a flow velocity of a dielectric fluid flowing in the penetrating space based on a Doppler frequency of the microwave received by the receiving antenna.

Although the invention has been described in considerable detail in language specific to structural features or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It is to be understood that the phraseology and terminology employed herein, as well as the abstract, are for the purpose of description and should not be regarded as limiting.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A flow measurement device, comprising:
    a wave guide tube type resonant cavity;
    a penetrating space that penetrates the resonant cavity;
    a duct support part that is made of a dielectric substance, is in the resonant cavity and surrounds an outside of the penetrating space;
    a transmitting antenna that transmits a microwave transmitting to a direction along a longitudinal axial direction of the resonant cavity to provide a standing wave or a traveling wave of the microwave, the microwave is transmitted in a space that is outside of duct support part and inside of the resonant cavity; and
    a receiving antenna that receives the standing wave or the traveling wave.

2. A flow measurement device as set forth in claim 1, further comprising:
    a metal cylinder that protrudes to outside from an opening of the penetrating space of the resonant cavity and has an opening diameter smaller than an inner diameter of the resonant cavity.

3. A flow measurement device as set forth in claim 1, wherein:
    the resonant cavity is formed in separable so that entire of the penetrating space can be exposed.

4. A flow measurement device as set forth in claim 1, wherein:
    the standing wave is provided in the resonant cavity; and
    the flow measurement device calculates a flow velocity of a dielectric fluid flowing in the penetrating space based on a frequency of an alternate current component of a received electric power received by the receiving antenna.

5. A flow measurement device as set forth in claim 1, wherein:
    the standing wave is provided in the resonant cavity; and
    the flow measurement device calculates a volume of a dielectric fluid flowing in the penetrating space based on a amplitude of an alternate current component of a received electric power received by the receiving antenna.

6. A flow measurement device as set forth in claim 5, wherein:
    the flow measurement device modifies the volume based on a direct current component of the received electric power received by the receiving antenna when the volume is calculated.

7. A flow measurement device as set forth in claim 1, wherein:
    the traveling wave is provided in the resonant cavity; and
    the flow measurement device calculates a flow velocity of a dielectric fluid flowing in the penetrating space based on a Doppler frequency of the microwave received by the receiving antenna.

* * * * *